United States Patent [19]
Andersson

[11] Patent Number: 4,743,824
[45] Date of Patent: May 10, 1988

[54] METHOD AND APPARATUS FOR CONTROLLING A MOTOR

[75] Inventor: Per C. Andersson, Sollentuna, Sweden

[73] Assignee: Telefonaktiebolaget L M Ericsson, Stockholm, Sweden

[21] Appl. No.: 11,638

[22] Filed: Feb. 6, 1987

[30] Foreign Application Priority Data

Apr. 18, 1986 [SE] Sweden ................... 8601802

[51] Int. Cl.⁴ .............................. H02P 8/00
[52] U.S. Cl. ....................... 318/696; 318/685
[58] Field of Search ................ 318/696, 685, 561

[56] References Cited

U.S. PATENT DOCUMENTS

| | | | |
|---|---|---|---|
| 4,349,771 | 9/1982 | Buxton | 318/685 |
| 4,471,278 | 9/1984 | Matouka | 318/561 |
| 4,563,619 | 1/1986 | Davis et al. | 318/138 |
| 4,651,076 | 3/1987 | Oltendorf et al. | 318/696 |

FOREIGN PATENT DOCUMENTS

2022345 12/1979 United Kingdom .

*Primary Examiner*—William M. Shoop, Jr.
*Assistant Examiner*—Saul M. Bergmann
*Attorney, Agent, or Firm*—Burns, Doane, Swecker & Mathis

[57] ABSTRACT

The invention relates to a method and apparatus for controlling the current (I1, I2) through a stator winding (L1, L2) of a motor (M) which is supplied with energy from a voltage source (V) via a drive circuit (DL1, DL2). The drive circuit is controllable such as to provide at least three different operational states, of which a first normally signifies increasing or maintained magnitude of the current, a second normally signifies shutting down or decreasing the current comparatively slowly and a third operational state normally signifies shutting down or reducing the current comparatively rapidly or at least quicker than in the second operational state. In a method and apparatus in accordance with the invention the desired value time sequence is sensed, and at least the possibility of control so that entry into the third operational state is limited in time in response to the result of sensing the desired value time sequence.

The method and apparatus are primarily intended for micro-stepping of a two-phase stepping motor with permanently magnetized rotor.

18 Claims, 6 Drawing Sheets

METHOD AND APPARATUS FOR CONTROLLING A MOTOR

TECHNICAL FIELD

The present invention relates to control of motors. A method and apparatus in accordance with the invention is used to advantage in microstepping of two-phase stepping motors with permanently magnetized rotors, the stator being supplied with energy from a d.c. source via a bridge circuit including transistors. However, the invention can also be applicable in certain other cases for controlling current through a stator winding in a motor supplied with energy from a voltage source via a drive circuit, the drive circuit including switches which are controllable into conductive and blocking states the current being regulated towards a desired value by controlling the drive circuit switches such as to achieve different combinations of states in response to the current magnitude in relation to the desired value.

BACKGROUND ART

The stepping motor, which is founded on old, well-known, basic ideas, has found extensive use in recent years in connection with the further technical development of both construction of the motor itself and its current supply. The basic principles of the stepping motor and its drive, as well as at least a certain amount of further development are well known to one skilled in the art, and are therefore not described here. However, for one not skilled in the art, reference is made to the book "STEPPING MOTORS: a guide to modern theory and practice" by P. P. Acarnley, published by Peter Peregrinius Ltd for the Institution of Electrical Engineers as No. 19 in the IEE Control Engineering series.

For one skilled in the art, micro-stepping is a well-known method of giving the stepping motor greater resolution than full stepping. Micro-stepping is so well known in connection with stepping motors that it ought not to be necessary to describe it here. However, further to the book mentioned above the following three references may be helpful to one unskilled in the art: "Mini-stepping motor drives" by E. K. Pritchard, Proceedings of the fifth annual symposium on incremental motion control systems and devices, University of Illinois; "TECHNOLOGY of MICROSTEPPING, OEM DESIGN," October 1983, pp 69–71; and to "Microstepping: Small Steps Turn Into Big Improvements" by E. Slingland, POWER CONVERSION INTERNATIONAL, October 1983, pp 20–25.

Many drive circuits are known for supplying current to stepping motors from voltage sources and regulating the phase currents through the stator windings. It is also well-known in these cases that current decline can be different for different drive circuits and that different operating conditions can give differently rapid current decline in a single drive circuit. Of special interest in connection with the present invention are drive circuits including controllable switches, which are intermittently controlled to be in a conductive or blocking state, whereby the current through a stator winding can be regulated towards a desired value. The basic principles for such drive circuits and such regulation are well-known to one skilled in the art and are therefore not described here. The first and last of the above-mentioned references are recommended to one unskilled in the art, and apparatus and a method illustrated on page 23 in the POWER CONVERSION INTERNATIONAL reference, may be of special interest for comparison with a preferred embodiment of the present invention.

DISCLOSURE OF INVENTION

Problems can occur in the operation of stepping motors, particularly when there are large demands on velocity, acceleration and retardation, in spite of a modern motor structure and modern drive circuits. These problems may take the form of vibrations and noise, as well as deviations between desired and actual rotational angle. Certain problems may be traced to resonance phenomena and mechanical properties of the motor structure, while others at least partially depend on the drive circuit and electrical properties of the motor structure, such as stator winding inductance. In certain operational cases, the drive circuits in known methods and apparatus have therefore not managed to regulate the stator current towards its desired value with sufficient accuracy. In certain cases the current has not been reduced sufficiently quickly in time with the desired value, and in other cases the current has oscillated heavily about the desired value so that too large a current ripple has been obtained. The object of the invention is to solve, or at least reduce such problems in controlling current to a stator winding, particularly in connection with the microstepping of stepping motors.

Somewhat simplified and shortly expressed, it could be said that a method in accordance with the invention is applicable in drive circuits which are controllable such as to enter into at least three different operational states, of which the first signifies maintenance or increase of the current, the second a comparatively slow current decline, and the third a comparatively rapid current decline. A method in accordance with the invention could then in short be said to signify, inter alia, that the possibility of using the third state is limited in time to certain sections of the desired value time sequence. The limitation of the possibilities of controlling the drive circuit is preferably such that during the entire, or greater portion of the time, the drive circuit can be controlled to be in either the first or in one of the second or third operational states although not in any of the second and third states. There is thus obtained a better possibility of sufficiently quickly and accurately regulating the current towards a varying desired value so that within reasonable limits the current is able to decrease or increase in time with a rapidly decreasing or increasing desired value without there being too large a current ripple. Audible noise and vibrations such as mechanical resonance from the motor and associated parts in the system can be reduced or completely eliminated in certain operational conditions. Furthermore, greater velocity can be achieved with the motor in certain cases. In other cases the electric attenuation of the motor position overshoot can also be improved.

In a corresponding way, an apparatus in accordance with the invention includes control limiting means arranged to limit in time at least the possibility of controlling the drive circuit so that it enters into the third operational state in response to the desired value time sequence.

In practice, a method and apparatus in accordance with the invention usually signifies that only or substantially only the first and the second operational states are utilized during the parts of the desired value time sequence when the magnitude of the desired value successively increases and at least the first and the third operational states, preferably also the second one, are used during the part of the desired value time sequence when the magnitude of the desired value successively decreases.

The operational states, which may be four in bipolar drive circuits, are achieved in accordance with the invention by controlling switches in the drive circuit such as to put them into different combinations of conductive and/or blocking states. At least partially, the drive circuit can be of a conventional type and the three or four combinations of conductive or blocking states of these switches can be of a kind already known per se.

The distinguishing features for a method and an apparatus in accordance with the invention are more correctly expressed in the disclosures of the claims, the subordinate claims also disclosing preferred embodiments.

BEST MODES FOR CARRYING OUT THE INVENTION

Figure 1:
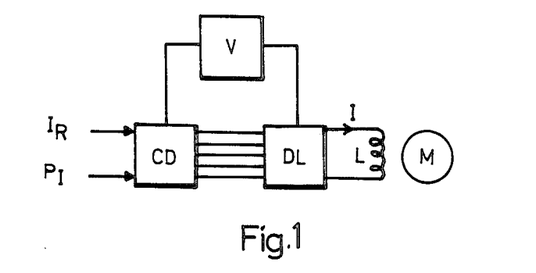
FIG. 1 is a greatly simplified block diagram of an embodiment of an apparatus in accordance with the invention, for use in explaining certain fundamentals of a method in accordance with the invention.

In FIG. 1 the letter L denotes a stator winding of a motor M supplied with energy from a voltage source V via a drive circuit DL. The drive circuit includes current switches, controllable individually such as to enter into conductive or blocking states. The switches are controlled with the aid of a control means CD, so that different combinations of conductive and blocking states of the different switches give different operational states to the drive circuit. The control means has a first input for a desired value $I_R$ of the current I through the stator winding, and is arranged to put the drive circuit into different operational states by controlling its switches so that they are put into different combinations of states for regulating the current towards its desired value. In a first combination of switch states, the drive circuit assumes a first operational state, which normally signifies that energy is supplied to the stator winding from the voltage source and that the current through the stator winding is maintained or increased. In a second combination of switch states, the drive circuit assumes a second operational state, which normally signifies that no notable energy is supplied to the stator winding from the voltage source and that the current through the stator winding ceases or decreases comparatively slowly. In a third combination of switch states the drive circuit assumes a third operational state, which normally signifies that the current through the stator winding ceases or decreases comparatively rapidly, and in any case more rapidly than in the second operational state, for otherwise equal motor loadings and conditions. The drive circuit, control means and motor are preferably such that no substantial amount of energy is fed back to the voltage source from the stator winding in the second operational state, and such that the third operational state allows feedback of a substantial amount of energy from the stator winding to the voltage source. The substantially quicker current decrease in the third combination of switch states compared with the second combination of switch states then preferably depends on energy feedback. It is possible that there may be a fourth operational state of the drive circuit, if it is of the bipolar type, this state being of principly the same type as the first one, but in which fourth state current passes through the stator winding in an opposite direction to that for the first operational state.

So far, the described function of the method and apparatus according to FIG. 1 is well known in principle. However, in accordance with the invention, the possibility of switching at least to the third combination is limited in time in response to the desired value time sequence. The control means thus has a second input for information P1 concerning this limitation, which can be rather different in different embodiments of the method and apparatus in accordance with the invention. The control means further includes control limiting means arranged to limit, in response to the received information PI, the ability of the control means, at least with regard to putting the switches into the third combination. In certain embodiments the ability of the control means to put the switches into the second combination is preferably limited in time in response to the desired value time sequence. In such embodiments the information PI may signify mutually dependent or independent limitations of the possibilities of putting the drive circuit into different operational states. The object of limiting the control of the control means in time, i.e. all three said operational states not always being available for regulating the stator winding current towards its desired value, is to achieve better current regulation. By this limitation in time, the current through the stator winding in a method and apparatus in accordance with the invention may be rapidly caused to follow changes in the desired value without too great a current ripple. The control of the drive circuit is preferably limited so that entry into the third operational state cannot occur during certain parts of the desired value time sequence, when the absolute magnitude of the desired value substantially increases, possibly also during certain parts when the absolute value of the desired value is substantially constant. Control of the drive circuit is also preferably limited so that entry into the second operational state cannot occur during certain time intervals, when the absolute value of the desired value decreases substantially. Control of the drive circuit is also preferably limited during certain parts when the absolute magnitude of the desired value sinks substantially, so that entry into the third operational state can only take place during special time intervals of these parts. The limitation in time of the possibilities of controlling the drive circuit is preferably such that during the whole, or greater part of the desired value time sequence the drive circuit can be controlled to enter into either the second or the third operational state, but not any of the second and the third states. On the other hand, the possibility of controlling entry into the first operational state is not normally limited in time, except possibly in bipolar drive circuits which have a fourth operational state for supplying energy from the voltage source to the stator winding in the form of a current in the opposite direction through the stator winding, compared with the current in the first operational state.

Figure 2:
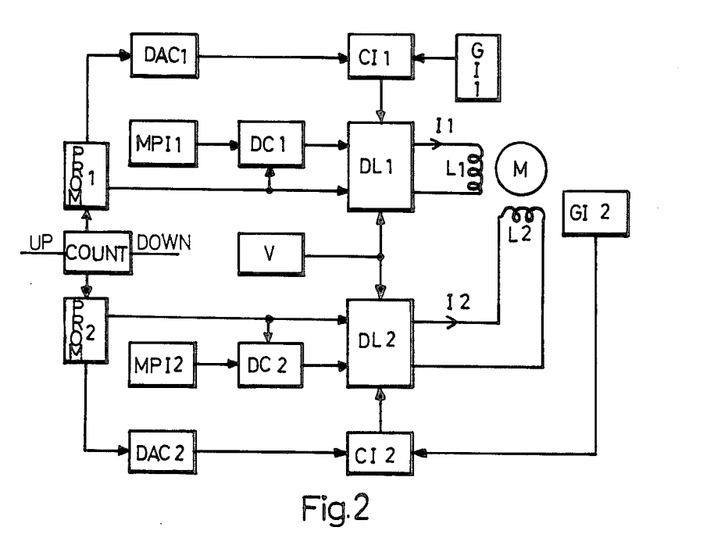
FIG. 2 is a simplified block diagram of an embodiment of the invention for a two-phase motor.

The simplified block diagram of FIG. 2 illustrates the application of the invention in the control of current in each of the stator windings of a two-phase motor into agreement with desired values, the time sequences of which are at least partially known in general. The phase windings L1 and L2 each has its drive circuit DL1 and DL2. The desired values $I1_R$ and $I2_R$ for the currents I1 and I2 through the stator windings are generated partially by digital circuits in an embodiment according to FIG. 2. Possible digital instant values for the desired values $I1_R$ and $I2_R$ are stored in programable memories PROM1 and PROM2, and feedout of the appropriate instant values from the memories is controlled by a counter COUNT, which is arranged to enable stepping it forwards, and possible also backwards, in time with pulse signals supplied to the counter. The respective digital instant values for the desired values are each supplied to a digital to analogue converter DAC1 and DAC2, for converting into analogue magnitudes. These analogue magnitudes are compared in analogue comparators CI1 and CI2 with analogue actual values representing the current in the respective phase winding, and are each generated by their respective actual value transducer GI1 and GI2.

Two memories MPI1 and MPI2 are arranged to store information as to the limitations applying for controlling the respective operational states in the drive circuits DL1 and DL2. The information in the memory MPI1 and MPI2 is digital and can, for example, give a certain value for $I1_R$ and $I2_R$ occurring amongst possible values in the PROM1 and PROM2 memories. The information from MPI1 and MPI2 is compared digitally with the desired value time sequence from PROM1 and PROM2 in digital deciding means DC1 and DC2 for deciding points in time for limiting the possibility of control. The means DC1 and DC2 may, for example, include a digital comparator for comparison between a value stored in MPI1 and MPI2 and the instant digital desired value fed out from PROM1 and PROM2, as well as means for digitally determining from the time sequence of digital instant values from PROM1 and PROM2 whether the instant value substantially increases or decreases with time. The means DC1 and DC2 can then be adapted to prevent putting DL1 and DL2 into the third operational state during a part of the time sequence of $I1_R$ and $I2_R$ when the magnitude of the desired value increases with time, possibly at least until this magnitude is at least just as great as the one given respectively by MPI1 and MPI2. Alternatively, or in addition, DC1 and DC2 may be adapted to at least periodically prevent entry into the second operational state during parts of the time sequences of $I1_R$ and $I2_R$, when the desired value decreases after having attained the volume given by MPI1 and MPI2. Optionally, two or more values can be stored in MPI1 and MPI2, thus enabling certain limitation of the possibility of entry into an operational state to be dependent on whether the desired value from PROM1 and PROM2, valid for the instant, or the absolute magnitude of the desired value is under two or more values stored in MPI1 and MPI2, or lies between two values stored in MPI1 and MPI2, or is over two or more values stored in MPI1 and MPI2. For example, the possibility of entry into the third operational state can be limited to times when magnitude of the desired value is decreasing and is between two values stored in MPI1 and MPI2.

For controlling the switches included in the respective drive circuit DL1 or DL2 such as to enter into one of the three combinations of conductive and blocking states, or possibly four such states in bipolar drive circuits, the respective drive circuit is connected to CI1, DC1 and PROM1 as well as CI2, DC2 and PROM2, information concerning desired current direction in the respective stator winding for bipolar drive circuits being obtained from PROM1 and PROM2 in the form of a polarity signal SIGN1 and SIGN2.

Figure 3A:
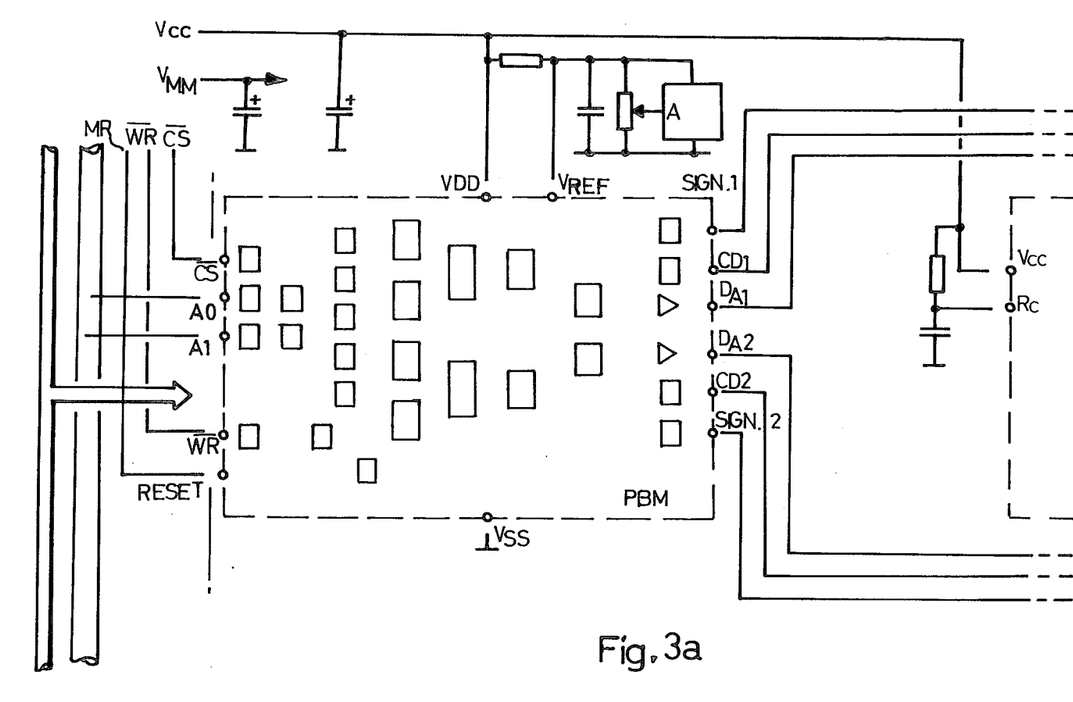
FIGS. 3a and 3b illustrate a more detailed diagram of how a motor can be controlled with the aid of an apparatus in accordance with the invention.
Figure 3B:
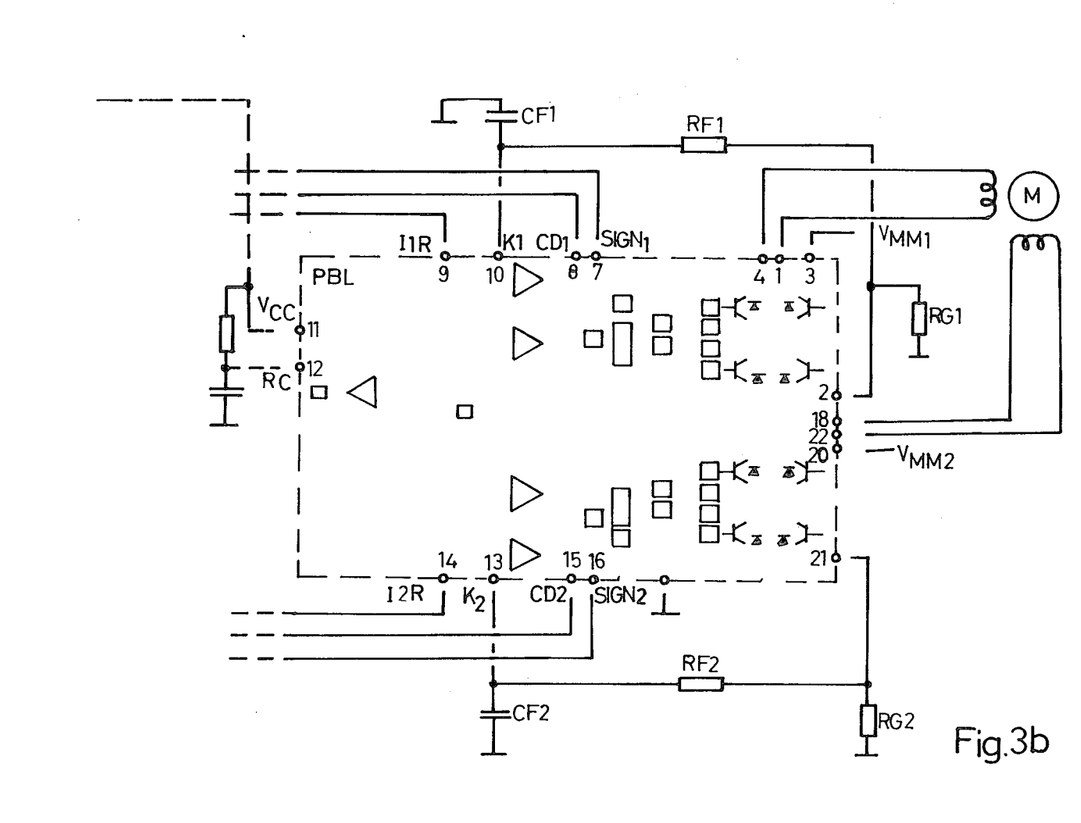

To facilitate understanding of the invention, the block diagram in FIGS. 1 and 2 is greatly simplified in relation to a wiring diagram that describes in detail an embodiment of an apparatus in accordance with the invention. A more detailed sketch of a preferred embodiment of an apparatus in accordance with the invention included as a part of an apparatus for computer controlled microstepping of a two-phase stepping motor is illustrated in FIGS. 3a and 3b. The apparatus illustrated in FIGS. 3a and 3b includes, inter alia, a two-phase stepping motor M, two integrated circuits PBL and PBM, delimited by dashed lines, a plurality of external components connected to connection points on the integrated circuits, and connections between the computer and one integrated circuit for control of the motor by the computer. Microprocessor control of microstepping stepping motors is today well-known to one skilled in the art, and numerous embodiments are described in the literature. Furthermore, there are special integrated circuits for the purpose, which are commercially available together with instructions for use and technical information. Any description of the microprocessor control itself or the exchange of information by the microprocessor to the integrated circuit in FIG. 3a, as well as the transmission of signals to this circuit, should therefore not be necessary. For the sake of completeness, however, it can be mentioned that the lefthand integrated circuit is formed to be compatible with an 8-bit microprocessor using a 5 MHz data bus, and in principle it is addressed in the same way as a memory. Microprocessors such as those sold under the names Motorola 6800, 6808 and 6809 as well as Intol 8085 may be used.

Figure 4:
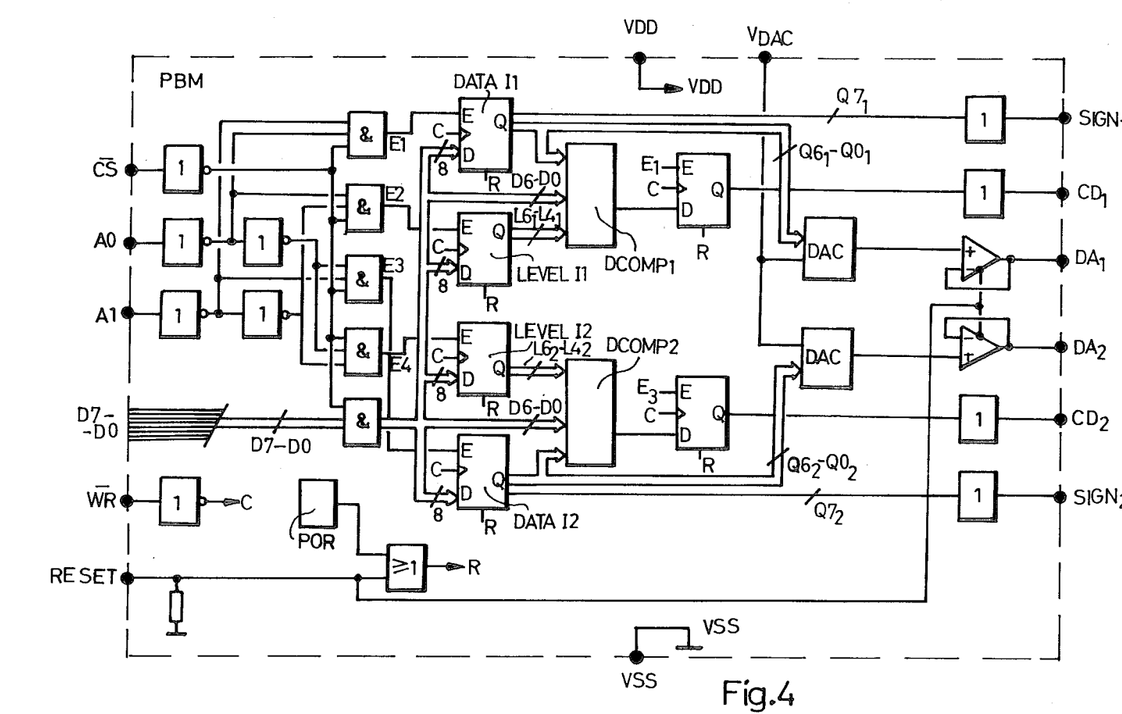
FIG. 4 illustrates a first integrated circuit which can be made a part of an apparatus for microstepping a two-phase stepping motor according to FIGS. 3a and 3b.

The integrated circuit of FIG. 3a is illustrated in more detail in FIG. 4, and its inputs for signals from the computer are denoted CS, AO, A1, D7–DO, WR and RF5FT, and are intended for a chip select signal, two address signals, eight data signals, a write signal and a reset signal. The integrated circuit includes a first and a second desired value memory, DATA 11 and DATA 12, for the respective digital desired value of the first and the second current. The circuit also includes a first and a second current point memory, LEVEL 11 and LEVEL 12, for a digital value of the magnitude of the first and second current, this value indicating a current value in the time sequence of the respective desired value, which at least partially decides certain times for limiting entry into the third and/or second operational state. Each of the two desired value memories and current point memories has an input D for data signals on the data bus as well as a plurality of further inputs R, C and E for resetting, controlling and activation signals. Logical circuits are connected between the memory inputs and the integrated circuit inputs CS, AO and A1 so that for signals on the data bus intended for the integrated circuit, only one of the desired value memories of one of the current point memories is activated, depending on the signals to the inputs AO and A1. The logical circuits therefore have four outputs E1, E2, E3 and E4 each coupled to one of the E inputs of the memories. Independent of the address signals to the inputs AO and A1, but in response to the signal to the input CS, information on the data bus can also be transferred directly to two digital comparators DCOMP1 and DCOMP2. Each of these comparators is connected to its respective desired value memory DATA 11 and DATA 12 and to its respective current point memory LEVEL 11 and LEVEL 12. Each of the digital comparators is arranged to digitally compare the latest current value received directly from the data bus with the current values in the respective two memories, to decide whether the desired value time sequence has come into a period when its magnitude decreases and whether the latest current value is less than the value in LEVEL 11 or LEVEL 12. Each digital comparator, has circuits including a D-type flip-flop connected to its output for generation, on the respective output CD1 and CD2 of the integrated circuit, of a control limiting signal for the respective drive circuit of the first and second phase winding. The D-type flip-flops each has an enabling input E connected to the output E3 or the output E1 of the logic. Thus possible changes in the control limiting signals on the output CD1 and CD2 are synchronized in time with the enabling signals from E1 and E3 respectively. For example, the control limiting signal CD1 may have a low level when the absolute magnitude of the desired value for the first stator winding current is decreasing and is less than the current point value. In remaining cases, i.e. when the desired value is not decreasing or is greater than the current point value, the control limiting signal has a high level.

The integrated circuit in FIG. 4 further has two digital to analogue converters DAC1 and DAC2, for converting the digital desired value from respectively DATA 11 and DATA 12 to an analogue value. The outputs of the converters are each coupled via their respective feedback amplifiers to respective outputs DA1 and DA2 on the integrated circuit, which integrated circuit furthermore has two outputs denoted SIGN1 and SIGN2. The signals on the outputs SIGN1 and SIGN2 are obtained from the sign bits D7 for the respective digital desired value in respective DATA 11 and DATA 12, and denote the direction of the desired value current through the respective phase winding of the motor. A high level on SIGN1 and SIGN2 thus indicates a certain direction, and low level thereon denotes the opposite direction for the desired current through the respective phase winding. The outputs SIGN1 and SIGN2, as with the outputs CD1, DA1, CD2 and DA2 are connected to corresponding inputs SIGN1, SIGN2, I1$_R$, CD1, I2$_R$ and CD2 in the integrated circuit in FIG. 3b. This circuit is shown in more detail in FIG. 5.

Figure 5:
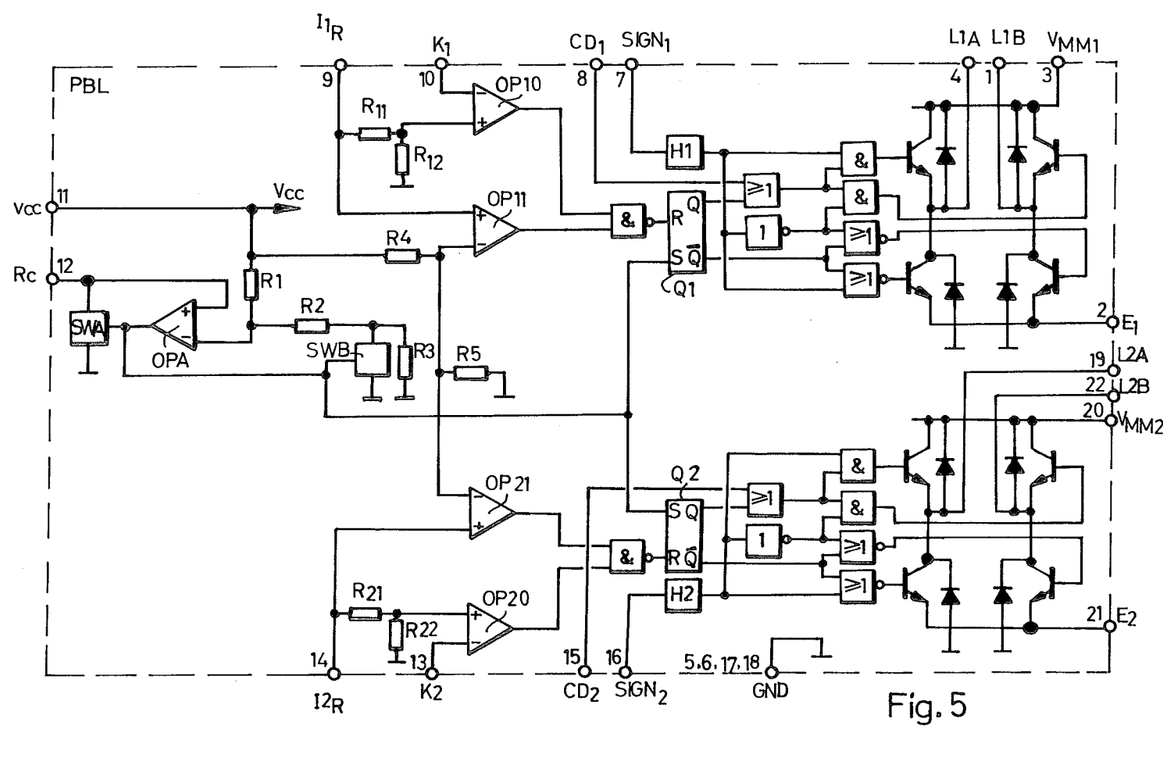
FIG. 5 illustrates a second integrated circuit which can be a part of an apparatus for microstepping a two-phase stepping motor according to FIGS. 3a and 3b.

The integrated circuit in FIG. 5 includes two principly alike drive circuits, with principly alike and separate control means, each intended for one of the phase windings of the motor, as well as certain components common to the control means. One drive circuit has two outputs L1A and L1B for connecting one phase winding L1 and the other drive circuit has two corresponding outputs L2A and L2B for connecting the second phase winding 1.2. Each of the drive circuits further has its respective input V$_{MM1}$ and V$_{MM2}$ for connection to a d.c. source and its respective output E1 and E2 for connection to earth via a current sensing resistor RG1 and RG2 and also via a filter circuit, each filter circuit containing a filter resistor RF1 and RF2 respectively, and a filter copacitor CF1 and CF2, respectively. The values of the sensing resistors, the filter resistors and the filter capacitors may be selected differently e.g. due to different motor properties. In a typical case RG1 and RG2 may be 1Ω. RF1 and RF2 may be 1kΩ and CF1 and CF2 may be 820 pF. The drive circuits are well-known, and therefore do not need to be described in themselves. It is also well-known that three principly different operational states in the respective drive circuit can be achieved by controlling their switches such as to enter into three different combinations of conductive and/or blocking states. When the known drive circuit is utilized for supplying current in both directions it is known to control the switches such as to enter into a fourth combination of states, which indeed differs from remaining ones, but apart from the current direction it provides principly the same operational state as one of the others.

The integrated circuit has inputs 11R, K1, CD1 and SIGN1 connected to the separate control means of the drive circuit for the first phase winding L1, as well as inputs 12R, K2, CD2 and SIGN2 connected to the separate control means for the drive circuit of the second phase winding L2.

In addition, the integrated circuit in FIG. 5 has and input V$_{CC}$ for a principly constant supply voltage and an input RC for a voltage varying with a capacitor charge. The capacitor can be periodically discharged via a switch SWA controlled via the output on a comparator UPA. The comparator is fed with voltage via RC and also with a voltage over two resistors R2 and R3 of three resistors in a voltage divider also including the resistance R1. The resistor R3 can be short-circuited by a switch SWB connected to the output of the comparator as in the switch SWA. The size of the resistors and the voltages as well as the comparator and switches are selected such that the comparator can generate pules on its output with a certain frequency independent of the desired values and actual values of the stator winding currents, these pulses being supplied to both the separate control means. The latter are also supplied a reference voltage obtained from the constant voltage on the input V$_{CC}$ with the aid of a voltage divider R4 and R5.

The comparators OP10 and OP20 are adapted for comparing the respective desired current value with the actual value supplied to the inputs K1 and K2 from actual value transducers including respectively RG1, RF1, CF1 and RG2, RF2, CF2, the filters RF1/CF1 and RF2/CF2, respectively, having the task of attenuating transients coming from switching phenomena in the semiconductors of the drive circuits. The desired values as well as the actual values are supplied in the form of voltages to the respective input. The output signals from OP10 and OP20 are therefore principly logical signals, the levels of which say whether the respective actual value magnitude is greater or less than the respective desired value magnitude. In a corresponding way, OP11 and OP21 are adapted to compare the respective desired value magnitude with a small reference voltage across R5 and to generate logical output signals saying whether the respective desired value essentially exceeds zero or not. The outputs from respectively OP10, OP11 and OP20 and OP21 are connected to logic in respective separate control means adapted to generate individual control signals for the individual switches in the respective circuit connection in response to signals from the inputs CD1, SIGN1, OP10, OP11 and the pulses from OPA or in response to the signals from the inputs CD2, SIGN2, OP20, OP21 and the pulses from OPA. In response to the signals to the respective logic, the latter can control the switches in the respective drive circuit such as to enter into four different combinations of states, of which two enable energy supply from the current source to the respective phase winding with current in opposite directions through the respective phase winding. Of the remaining two, one combination enables feedback of energy from respective phase winding to its voltage source via respective drive circuit, while in the remaining combination there is neither any substantial energy supply from the voltage source to the respective phase winding nor any substantial feedback of energy from the respective phase winding to the voltage source. The combinations with associated operational states in the respective drive circuit are known per se to one skilled in the art in the illustrated drive circuit and are therefore not described here.

The logic of the respective drive circuit is formed so that the circuit is controlled to enter into an operational state enabling the supply of energy from the voltage source only when the respective absolute magnitude of desired value exceeds the respective absolute magnitude of actual value. The logic is also such that the respective drive circuit, from the last-mentioned operational state, is controlled to enter into another operational state where no substantial energy is supplied to the respective stator winding only when the respective desired value no longer exceeds the respective actual value, or when the desired value is so small that it does not substantially differ from zero. The respective operational state into which the logic causes the respective drive circuit to enter in such a case depends on the input signal CD1 and CD2. Depending on the level of the input signal CD1 and CD2, the control means logic is namely prevented from controlling the drive circuit such as to enter into the operational state enabling feedback of energy from the respective phase winding to the voltage source, whereby entry into this state can only take place for decreasing magnitudes of the desired value when the desired value magnitude is less than the current point value.

In order to obtain well-defined junctions between different operational states, where energy is supplied to the respective stator winding from the voltage source, and other operational states where energy is not supplied to the respective stator winding from the energy source, each separate control means includes a bistable flip-flop Q1 and Q2. The setting inputs S of the respective flip-flops are supplied the pulses from OPA and the resetting inputs R of the multivibrators, which dominate over the setting inputs are supplied with signals coming from OP10, OP11 and OP20 and OP21, the multivibrators are connected to remaining logic in the respective control means so that said junctions are synchronized with the pulse frequency from OPA.

To avoid the risk of short-duration, short-circuiting or other undesired combinations of states in the switches of the respective drive circuit the inputs SIGN1 and SIGN2 are connected to remaining logic in the respective control means via hysteresis circuits H1 and H2. The hysteresis circuits ensure that the switches which are put into a conductive state for driving current in one direction through the respective phase winding have time to shut off before other switches have time to be put into a conductive state for driving current in the other direction through the respective phase winding. Since the logic comprises components known per se of the type AND-gates, inverting OR-gates and inverters provided with customary symbol denotations, further description of the logic ought to be completely unnecessary for one skilled in the art to understand the implementation of the invention.

Figure 6:
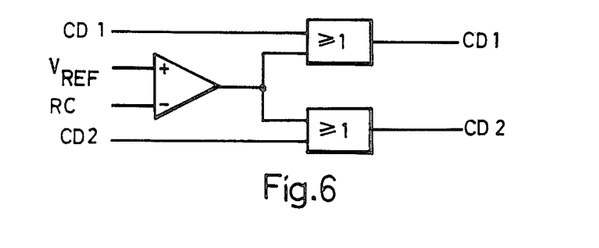
FIG. 6 illustrates an embodiment of a circuit which may preferably be included in an apparatus in accordance with the invention for implementing a preferred embodiment of a method in accordance with the invention.

The embodiment described so far in connection with FIGS. 3–5 provides a comparatively simple limitation of the possibility of controlling the respective drive circuit such as to enter into certain operational states. A somewhat more sophisticated limitation of the control possibilities may be obtained by modifying this embodiment in accordance with FIGS. 6 and 7. In FIG. 6 there is illustrated a dividing means for dividing the period time T of the pulses from OPA into first and second time intervals $T_1$ and $T_2$, and for actuating a control means so that entry into one operational state is inhibited during the first interval $T_1$ and entry into another state is inhibited during the second time interval $T_2$. The dividing means includes a comparator, one input of which is intended for connection to the input RC on the integrated circuit in FIG. 3b, and to have its other input connected to an adjustable reference voltage $V_{REF}$. The comparator is adapted to generate on one output a substantially logical signal with a level responding to whether the voltage on the input RC exceeds or falls below the reference voltage $V_{REF}$. If the latter has a value between the highest and lowest value of the voltage RC, which is almost sawtooth-shaped in time, there is obtained on the output of the comparator what is essentially a pulse train, the frequency of which concurs with the sawtooth voltage frequency and the pulse time relationship, i e. the relationship between the time intervals $T_1$ and $T_2$, depends on the magnitude of $V_{REF}$. The output of the comparator is connected to the respective input of two OR circuits intended for connection, one between the output CD1 and the input CD1 of the integrated circuits in FIG. 3 and the other between output CD2 and input CD2 of the integrated circuits in FIG. 3.

With the aid of the dividing means the inputs CD1 and CD2 may be modified so that the respective control means is prevented during each period of the signal from OPA, firstly during a first time interval $T_1$, from putting the respective drive circuit into an operational state enabling feedback of energy from the respective phase winding to the voltage source, and thereafter during a second time interval $T_2$, which constitutes the rest of the period T, is prevented instead from putting the respective drive circuit into another operational state in which substantial energy is neither supplied to the respective phase winding from the voltage source nor fed back from the respective phase winding to the voltage source. Since these different operational states normally signify that the current through the respective phase winding declines comparatively rapidly or comparatively slowly, there may be achieved in certain conditions with decreasing desired value, with the aid of subdividing the period time T, even better regulation of the respective current towards the respective desired value with even less current ripple By varying $V_{REF}$, the magnitude of the first time intervals $T_1$ relative the second time intervals $T_2$ can be varied, which has been found to be an advantage in adapting to different motors with different properties, such as stator winding inductance. The value of $T_1$ relative to $T_2$ may also be varied to adapt the current control to different power supply voltages.

Figure 7:
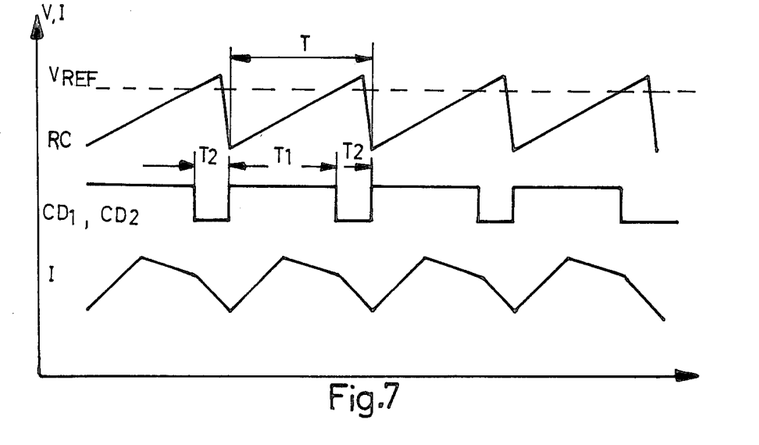
FIG. 7 illustrates a time sequence for voltages and currents in connection with an embodiment according to FIG. 6.

Of the curves in FIG. 7, the upper one illustrates the time sequence of the generally sawtooth shaped voltage on the input RC, the middle one the time sequence of the signal on the output of the comparator in the dividing means and a conceivable time sequence in CD1 or CD2, while the lower one is a conceivable, simplified time sequence of the current through a stator winding when the desired value is practically constant. It will be seen from the lower curve that the circuit in question is controlled such as to have a certain cyclic sequence of operational states, in each cycle there being included a state with current increase, followed by a state of slow current decrease and finally a following state of rapid current decrease. Although it cannot be entirely discounted that such a cyclic control may be suitable in certain cases for a substantially constant desired value, this cycle has been found particularly suitable during parts of a time sequence of the desired value when the latter rapidly decreases. During times when the absolute magnitude of the desired value rapidly increases it has been found that different cycles solely including states with current increase followed by states of slow current decrease are more advantageous than the cycle illustrated in FIG. 7.

To avoid any misunderstanding it is pointed out that in the embodiments described above, in all cases the limitations of the possibility of controlling into an operational state with comparatively rapid or comparatively slow current decline are limitations in time in response to the desired value time sequence. In the described embodiments, the limitations are thus not dependent on how much the actual value differs from the desired value. For example, rapid current decline is not limited to the cases when the desired value is very much smaller than the actual value and slow current decline is not only applied in the cases where the desired value is only slightly less than the actual value. For example the absolute magnitude of the desired value and the magnitude of the actual value in relation to the magnitude of the desired value affect how large a part of the time interval T1 in FIG. 7 during which the drive circuit is put into the first or second operational state. On the other hand, the magnitude of the actual value in relation to the desired value cannot affect the magnitude of the time interval T1 in relation to the magnitude of the time interval T2 in the embodiment described in connection with FIGS. 6 and 7.

Also in order to avoid misunderstandings, it is pointed out that the respective desired value in the embodiments described above is not of the type to-/from, but its magnitude can normally assume a large number of different values between a greatest and a least. For example, 128 different values can be given digitally with 7 bits. For at least the majority of these the respective drive circuit is controlled alternatingly to enter into different operational states with an alternating frequency corresponding to the pulse frequency from OPA, and this pulse frequency should lie above the audible frequency range and could be 26.5 kHz, for example.

Figure 8:
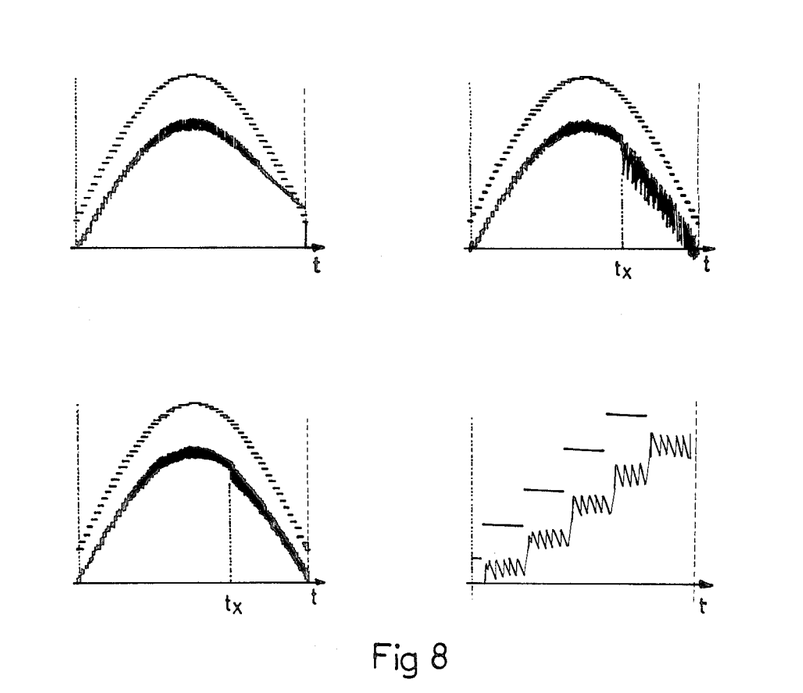
FIG. 8 illustrates stepwise changing desired current values and corresponding actual current values obtained when the drive circuit was prevented from using the second and third operational states during certain times of the time sequence.

FIG. 8 illustrates separately for each of four current control cases stepwise changing desired current values and corresponding actual current values obtained when the drive circuit is prevented from using the second and third operational states during certain times. In all cases illustrated in FIG. 8 the desired current value is given a zero reference level and magnification somewhat different than those of the corresponding actual current value to avoid interference. Thus the upper curve in each case illustrates the magnitude of the desired current values versus time whereas the lower curve in each case illustrates the magnitude of the actual current value versus time. In all four cases the desired current value changes stepwise with time like part of a quantisized sinus curve. In three of the case FIG. 8 illustrates the magnitudes of desired and actual current values during a time period corresponding substantially to half a cycle of the sinus curve. In the fourth case FIG. 8 illustrates a desired current value and a corresponding actual current value during a much shorter time than that corresponding to half a cycle of the sinus curve. Thus the time scale and the size scale of three cases in FIG. 8 are substantially the same and substantially different from the time scale and the size scale of the fourth case in FIG. 8.

In upper left case illustrated in FIG. 8 the actual current curve was obtained when the drive circuit was continously prevented from using the third operational state during the entire time illustrated. It appears from the curves of this case, especially the lower right hand part, that the drive circuit was unable to decrease the actual current value as fast as the sinuoidal decrease of the desired current value at the end of the illustrated half sinus cycle. Such a deviation of the actual current value from the desired current value is sometimes called current dragging by those skilled in the art. Of course current dragging is normally not desirable.

In the upper right case illustrated in FIG. 8 the actual current curve was obtained when the drive circuit was prevented from using the third operational state during that part of the half sinus cycle which is to the left of the time $t_x$, and the drive circuit was prevented from using the second operational state during that part of the half sinus cycle which is to the right of the time $t_x$. It appears from the curves of this case, especially the right hand part, that the drive circuit was able to decrease the actual current value substantially as fast as the sinusoidal decrease of the desired current value at the end of the illustrated half sinus cycle. However, there are substantial alternating differences between the actual current value and the desired current value especially during the time when the third operational state but not the second operational state is used. Although the average in time of the actual current value generally follows the average sinusoidal value of the stepwise decreasing desired current value, the instant value of the actual current exhibits strong deviations from this sinusoidal average. These deviations are sometimes called current ripple. A comparatively big ripple as in the right hand part of this case is normally undesirable.

In the lower left case illustrated in FIG. 8, the actual current curve was obtained when the drive circuit was prevented from using the third operational state during that part of the half sinus cycle which is to the left of the time $t_x$, and the drive circuit was allowed to use both the second and the third operational states during that part of the half sinus cycle which is to the right of the time $t_x$. During the time to the right of $t_x$ the drive circuit was allowed to use the second operational state and the third operational state during separate alternating time intervals like T1 and T2 according to FIG. 7. It appears from the curves of this case that the current ripple obtained in this case was substantially smaller than the current ripple obtained according to the previously described case. It also appears from the curves of this case that the drive circuit was able to decrease the actual current value as fast as the sinusoidal decrease of the desired current value at the end of the illustrated half sinus cycle.

In the lower right case illustrated in FIG. 8 the stepwise changing of the desired current value with time is clearly visible. In this case it is also visible that the frequency of controlling the drive circuit into different operational states, i e. the frequency of the pulsed from OPA in FIG. 5, is much higher than the frequency of changes in the desired current value.

The invention is not limited to the described embodiments of the method and apparatus, and somewhat different embodiments are conceivable within the scope of the claims. For example, it is conceivable to use another drive circuit known per se, which is controllable such as to provide the three different operational states. It is also conceivable to have a common current point mamory for the currents of both phase windings instead of a separate one for the respective phase winding current.

I claim:

1. An apparatus for controlling current (I, I1, I2) through a stator winding (L, L1, L2) in a motor (M), which motor is connected to a power source (V, $V_{MM1}$, $V_{MM2}$) via a drive circuit (DL, DL1, DL2), which drive circuit comprises switches controllable such as to enter into conducting and blocking states, which apparatus comprises actual value means (GI1, RG1, RF1, CF1, GI2, RG2, RF2, CF2) for generating an actual value corresponding to the actual current, comparison means (CI1, CI2, OP10, OP20) for comparing the actual value with a desired value (I1R, I2R), which desired value varies at least from time to time and has a magnitude which successively increases during certain time periods and successively decreases during other time periods, which apparatus comprises control means for controlling the states of the switches into different combinations of states for causing the actual value to approach the desired value, which control means and which drive circuit are arranged such as to provide the possibilty of controlling the state of the switches into any of three different combinations of states, whereby in a first of the three combinations of states energy is supplied from the power source to the stator winding via at least one conducting switch in the drive circuit, whereby in a second of the three combinations of states no substantial energy is supplied to the stator winding from the power source, whereby in a third of the three combinations of states a current in the stator winding may be reduced substantially more rapidly than it would be reduced in the second of the combinations of states during equivalent conditions, characterized by means (MP11, MP12, LEVEL11, LEVEL12, DC1, DC2, DCOMP1, DCOMP2) for sensing the desired value time sequence and for restricting in time the possibility of the control means to control the states of the drive circuit switches so that the switches enter into the third combination of state in response to the result (CD1, CD2) of the sensing of the desired value time sequence.

2. An apparatus as claimed in claim 1, characterized in that the means for sensing the desired value time sequence include means for deciding whether the magnitude of the desired value successively increases or decreases.

3. An apparatus as claimed in claim 1, characterized in that the means for sensing the desired value time sequence include memory means (MPI1, MPI2, LEVELI1, LEVELI2) for storing a predetermined value, and comparison means (DC1, DC2, DCOMP1, DCOMP2) for comparing the desired value with the predetermined value and generating a signal (CD1, CD2) in response to the result of the comparison.

4. An apparatus as claimed in claim 1, characterized in that the means for sensing the desired value time sequence include means (R4, R5, OP11, OP21) for sensing whether the desired value substantially differs from zero.

5. An apparatus as claimed in claim 1, characterized by time interval generating means (R1, R2, R3, OPA, SWA, SWB) for generating a cyclic sequence of first time intervals (T1) and second time intervals (T2), which time interval generating means are connected to prevent the use of the third combination of switch states during the first time intervals when the desired value decreases, and which time interval generating means are connected to prevent the use of the second combination of switch states during the second time intervals when the desired value decreases.

6. Apparatus as claimed in claim 5, characterized by interval setting means ($V_{REF}$) for setting the relative magnitude relationship between the first and the second time intervals independent of the magnitudes of the desired value and the actual value.

7. Apparatus as claimed in claim 6, characterized in that the control means and drive circuit are formed so that in the second combination of switch states no substantial energy is fed back from the stator winding to the power supply via the drive circuit and so that in the third combination of switch states substantial energy can be fed back from the stator winding to the power supply via the drive circuit.

8. An apparatus for controlling current through a stator winding in a motor in response to a desired value, which desired value varies at least from time to time and has a magnitude which successively increases during certain time periods and successively decreases during other time periods, which motor is connected to a voltage source via a drive circuit, which drive circuit has at least three different operational states, in a first of the three operational states energy being supplied from the voltage source to the stator winding via the drive circuit, in a second of the three operational states no substantial energy being supplied to the stator winding from the voltage source via the drive circuit and no substantial energy being fed back from the stator winding to the voltage source via the drive circuit, in a third of the three operational states no substantial energy being supplied to the stator winding from the voltage source via the drive circuit but substantial energy may be fed back from the stator winding to the voltage source via the drive circuit, which apparatus comprises actual value means for generating an actual value corresponding to the actual current, comparison means for comparing the actual value with the desired value, desired value sensing means for sensing the desired value time sequence to determine whether the desired value is smaller or greater than at least one predetermined value independent of the actual value and to determine whether the desired value is increasing or decreasing, and control means for controlling the drive circuit to enter into one of the operational states in response to both the result of the comparison between the actual value and the desired value and the result of the sensing of the desired value time sequence.

9. An apparatus as claimed in claim 8, wherein the control means are arranged to control the drive circuit into either the first or the second but not the third operational state when the desired value is increasing, and the control means are arranged to control the drive circuit into either the first or the third but not the second operational state during at least certain time intervals when the desired value is decreasing and less than a predetermined value.

10. A method of controlling current through a stator winding of a motor supplied with energy from a voltage source via a drive circuit including switches controllable to enter into conducting and blocking states, comprising the steps of:
sensing said current,
generating an actual value corresponding to said sensed current,
comparing said actual value with a desired value, wherein said desired value varies at least from time to time and has a magnitude which successively increases during certain time periods and successively decreases during other time periods,
regulating said current towards said desired value by controlling said drive circuit switches so that one of at least three different combinations of states is entered into in response to said comparison between said actual value and said desired value, wherein in a first of said three combinations of states energy is supplied from said voltage source to said stator winding via at least one conducting switch in said drive circuit, in a second of said three combinations of states no substantial energy is supplied to said stator winding from said voltage source, and in a third of said three combinations of states a current in said stator winding may be reduced substantially more rapidly than it would be in said second combination of states during equivalent conditions,
sensing the desired value time sequence to determine the magnitude of said desired value in a time sequence, and
controlling said drive circuit switches in response to said comparison between said actual value and said desired value so that the time said switches enter into said third combination of states is restricted in response to the result of said sensing of said desired value time sequence.

11. The method as claimed in claim 10 wherein said switches are controlled so that the entry into said third combination of states is prevented during times when said sensing of said desired value time sequence indicates that the magnitude of the desired value successively increases.

12. The method as claimed in claim 10 wherein said switches are controlled so that entry into said third combination of states is prevented except when said sensing of said desired value time sequence indicates that the magnitude of the desired value is constant or decreasing.

13. The method as claimed in claim 10 wherein said switches are controlled so that the entry into said third combination of states is prevented except when said sensing of said desired value time sequence indicates that the magnitude of the desired value differs substantially from zero, that the magnitude of the desired value does not exceed a predetermined value and that the magnitude of the desired value successively decreases.

14. The method as claimed in claim 10 further comprising the step of:
generating a cyclic series of first time intervals and second time intervals, and
wherein when said sensing of said desired value time sequence indicates that the magnitude of the desired value successively decreases, said switches are controlled so that their entry into said second combination of states is limited in time to said first time intervals and their entry into said third combination of states is limited in time to said second time intervals.

15. The method as claimed in claim 14 wherein the relative magnitude relationship between said first time intervals and said second time intervals is set independently of the magnitudes of the desired value and the actual current value.

16. The method as claimed in claim 15 wherein in said second combination of states no substantial energy is fed back from said stator winding to said voltage source, and in said third combination of states substantial energy can be fed back from said stator winding to said voltage source via said drive circuit.

17. A method of microstepping control of current through a stator winding of a stepping motor in response to a desired value, which desired value successively increases during certain time periods and successively decreases during other time periods, and wherein said motor is supplied with energy from a voltage source via a drive circuit, wherein said drive circuit has at least three different operational states, wherein in a first of said three operational states energy is supplied from said voltage source to said stator winding via said drive circuit, in a second of said three operational states no substantial energy is supplied to said stator winding from said voltage source via said drive circuit and no substantial energy is fed back from said stator winding to said voltage source via said drive circuit, and in a third of said three operational states no substantial energy is supplied to said stator winding from said voltage source via said drive circuit but substantial energy may be fed back from said stator winding to said voltage source via said drive circuit, comprising the steps of:
sensing said current,
generating an actual value corresponding to said sensed current,
comparing said actual value with said desired value,
sensing the desired value time sequence to determine whether the desired value is smaller or greater than at least one predetermined value independent of the actual value and whether the desired value is increasing or decreasing, and
controlling said drive circuit so that one of said operational states is entered into in response to both the result of said comparison between the actual value and the desired value and the result of said sensing of said desired value time sequence.

18. The method as claimed in claim 17 wherein said drive circuit is controlled to enter into one of said first operational state and said second operational state but not said third operational state when said desired value is increasing, and wherein said drive circuit is controlled to enter into one of said first operational state and said third operational state but not said second operational state during at least certain time intervals when said desired value is decreasing.

* * * * *